Patented Apr. 26, 1932

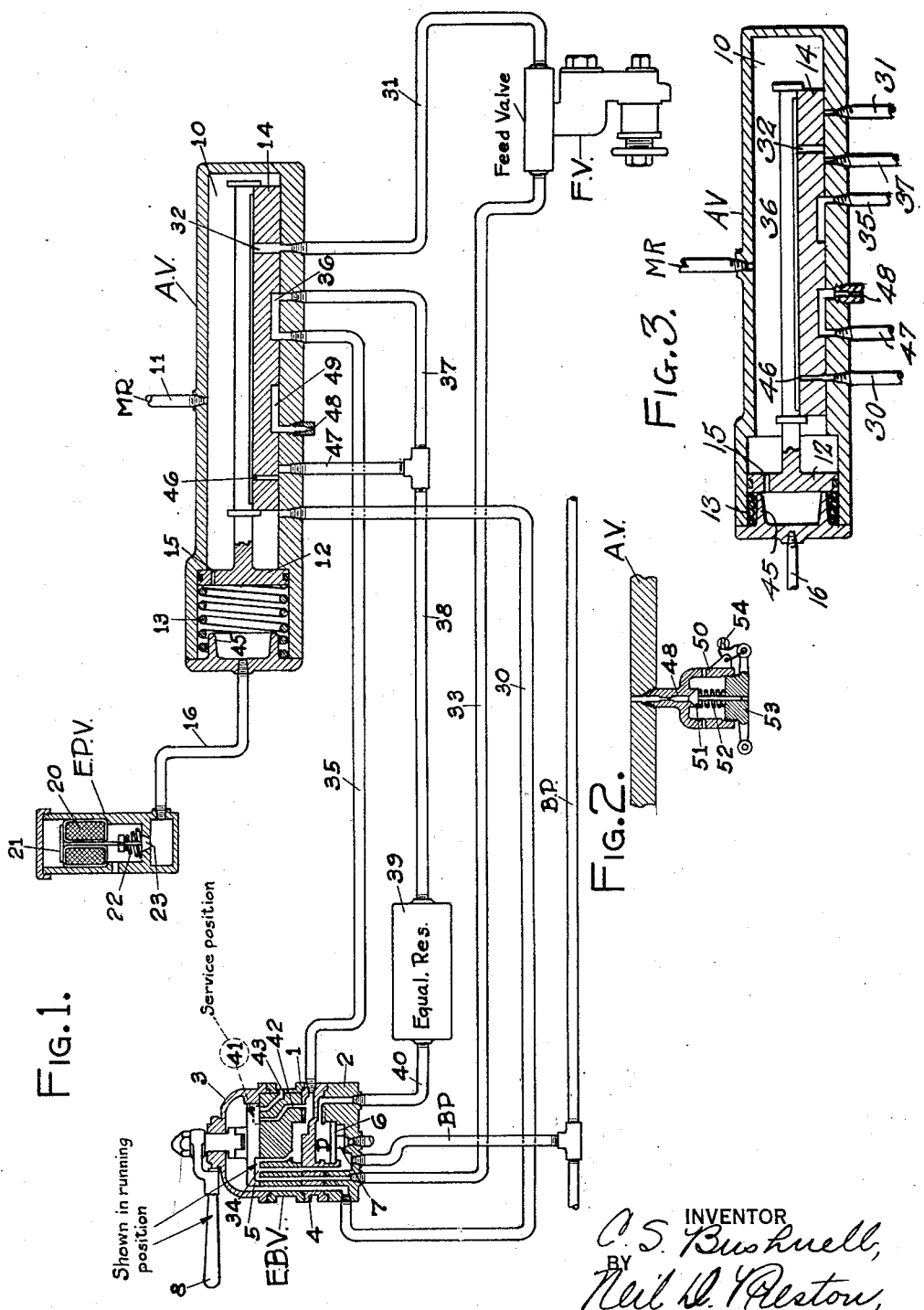

1,855,595

UNITED STATES PATENT OFFICE

CHARLES S. BUSHNELL, OF ROCHESTER, NEW YORK, ASSIGNOR TO GENERAL RAILWAY SIGNAL COMPANY, OF ROCHESTER, NEW YORK

BRAKE APPLYING APPARATUS

Application filed August 27, 1928. Serial No. 302,237.

This invention relates to apparatus for applying the usual air brakes of a railway train in response to a control imposed by suitable train control apparatus.

The present invention is particularly applicable to air brake systems of the normally charged brake pipe type, in which venting of the brake pipe effects a brake application. Modern air brake systems for both passenger and freight train service are usually of the engine and tender or E. T. type, in which the engine and tender brakes are controlled by a distributing valve, which valve allows main reservoir pressure to flow to the brake cylinders to an extent depending on the degree of the venting of the train pipe. Any automatic brake applying apparatus should be so constructed that the brake application cannot be interfered with by the engineer moving his engineer's brake valve to the release or running position; one way of accomplishing this is by cutting main reservoir pressure off from the chamber above the rotary valve of the engineer's brake valve. In a system of this kind (E. T. system) movement of the main engineer's brake valve to the emergency brake applying position causes main reservoir pressure to be applied from the pressure source on top of the rotary valve of the main brake valve to the application chamber of the distributing valve, and for this reason main reservoir pressure should not be entirely cut off from the top of the rotary valve of the engineer's brake valve when an automatic brake application is imposed. If this were done a manual emergency brake application could not be effected upon the engine and tender brakes during an automatic application, although such movement of the engineer's brake valve to the emergency position would vent the brake pipe very quickly but would probably not cause an emergency application of the train or engine brakes. In practice it is considered expedient to give an automatic service application of the brakes only, and in a manner so that the engineer can make additional brake application but cannot effect release of the brakes.

In accordance with the present invention it is proposed to add as little supplemental apparatus as possible to the usual E. T. air brake equipment including the usual main and independent engineer's brake valves, equalizing reservoir, feed valve, distributing valve, brake pipe and brake applying apparatus on each car connected thereto, and the usual source of fluid pressure; and to have the resulting system effective to make a service brake application in a manner so that the engineer cannot nullify it by moving his main engineer's brake valve to the running or release position. A further object of the present invention is to devise automatic brake applying apparatus which makes use of the same equalizing reservoir and the same equalizing discharge piston and valve as used when a manual brake application is made. For reasons above stated it is not considered expedient to cut off main reservoir pressure from the top of the rotary valve of the engineer's brake valve to prevent the engineer nullifying the automatic brake application, and in accordance with the present invention it is proposed to restrict the flow of main reservoir pressure to the top of the rotary valve during an automatic brake application to an extent to prevent the engineer recharging the brake pipe, but allowing sufficient main reservoir pressure to flow to the engineer's brake valve to permit the engineer to effect an emergency brake application of the engine and tender brakes by his movement of the main brake valve to the emergency position. In this position of the engineer's main brake valve main reservoir pressure is fed to the application chamber of the distributing valve.

Also, in accordance with the present invention it is proposed to insert an additional section between two sections of the usual engineer's brake valve, this insert or section in effect comprising a partition between the chamber above the equalizing discharge piston valve (chamber D) and the rotary valve of the engineer's brake valve, and in providing a by pass around this partition effective only when the automatic brake applying apparatus is in its normal non-braking position. By this arrangement, the same equalizing reservoir and equalizing discharge piston valve may be used for an automatic brake application, in that, the engineer would not be able to recharge the equalizing reservoir during an automatic brake application.

Other objects, purposes and characteristic features of the invention will be readily apparent from the accompanying drawings when considered in connection with the usual E. T. air brake equipment and the accompanying specification.

In describing the invention in detail reference will be made to the accompanying drawings in which:—

Fig. 1 shows conventionally one embodiment of the present invention;

Fig. 2 shows a limited reduction cut-off valve usable in connection with the system shown in Fig. 1; and Fig. 3 shows the application valve of Fig. 1 in its application position.

Referring to the drawings the device EBV is the usual engineer's brake valve comprising sections 1 and 2, the usual cap 3, and an additional, or special, insert section, or fitting 4 which has been inserted in between the main sections 1 and 2. This engineer's brake valve includes the usual rotary valve 5, the usual equalizing discharge piston and valve 6—7, and contains the usual handle 8. The apparatus also includes an application valve AV having a valve chamber 10 connected to main reservoir pressure MR by a pipe 11, and having a piston 12 held in its right hand extreme position by a compression spring 13 and operatively connected to the slide valve 14. The piston 12 is provided with a restricted feed port 15 for purposes more easily explained hereinafter.

The spring chamber is connected by a pipe 16 to an electro-pneumatic valve EPV. This valve EPV comprises a suitable coil 20, controlled by suitable train control apparatus, which upon energization thereof attracts the armature 21 in opposition to the compression of spring 22 and effects seating of the valve 23, thereby preventing the escape of fluid pressure from the spring chamber of the application valve OV.

The apparatus illustrated also includes a feed valve FV which instead of being directly connected to the engineer's brake valve EBV is connected through a cut off port 32 in the application valve to allow main reservoir pressure fluid to flow to the feed valve only when the application valve is in the normal inactive position, and in turn allow feed valve pressure to flow to the brake pipe only under this normal condition of the application valve. The various operating features and advantages are more clearly pointed out in considering the operation of the system.

*Operation*

Under normal conditions of the apparatus with the application valve in its right hand position and the engineer's brake valve in the running position, as shown, main reservoir pressure may flow through the pipe 11 into the valve chamber 10 through pipe 30, then to the chamber on top of the rotary valve 5, this pressure holding the rotary valve 5 on its seat and resulting in a fluid pressure source for recharging the brake pipe and for effecting an emergency application of the engine and tender brakes. Main reservoir pressure is also applied to the feed valve FV from valve chamber 10, through port 32 in the slide valve 14 and pipe 31, which results in feeding a reduced or feed valve pressure through the pipe 33 and cavity 34 of the rotary valve, to the brake pipe BP and the chamber below the equalizing discharge piston valve 6, and also feeding feed valve pressure through pipe 35, cavity 36 in the slide valve 14, pipes 37 and 38, equalizing reservoir 39, pipe 40, to chamber D above the equalizing discharge piston valve 6—7. It is thus seen that feed valve pressure exists on both sides of the equalizing discharge piston 6. Main reservoir pressure in the valve chamber 10 of the application valve may flow through the restricted feed port 15 in piston 12 and build up pressure in the spring chamber, so that this pressure in addition to the force of spring 14 will hold the piston 12 in its right-hand position.

Should the engineer now desire to make a manual service brake application, he may do so by moving the handle 8 to the service position, thereby bringing the service cavity 41 shown in dotted lines over the ports 42 and 43, thereby venting the equalizing reservoir 39, and in turn chamber D, to atmosphere. The reduction of pressure in chamber D over the equalizing discharge piston 6 causes the valve 7 to open until the brake pipe pressure has been reduced to the same value as that existing in the equalizing reservoir. In this connection it is of course understood that the feed cavity 34 in the rotary valve no longer connects the feed valve pipe 33 to the brake pipe.

Should now the engineer desire to again quickly recharge the brake pipe and release the brakes immediately, he may do so by moving his engineer's brake valve handle 8 to the release position, in which position thereof main reservoir pressure is fed from the chamber above the rotary valve 5 to the brake pipe BP and to the equalizing reservoir 39 through pipe 35, 37, and 38, by ports (not specifically shown) in the rotary valve 5.

Let us now assume that a suitable train control mechanism (not shown) de-energizes the coil 20 of the device EPV, thereby allowing the spring 22 to lift the valve 23 and vent fluid pressure from the spring chamber of the application valve AV. Since the port 15 is comparatively small, fluid pressure can escape much faster from the spring chamber than it can be fed thereto through this port 15, so that the pressure on the left side of piston 12 is reduced to a value where main reservoir pressure on the right hand side of this piston 12 operates the same against the tension of spring 13, to a point where the piston 12 engages the stop shoulder 45.

With the slide valve 14 shifted to the extreme left-hand position the restricted feed port 46 in slide valve 14 is disposed over the pipe 30 so that main reservoir pressure can flow to the top of the engineer's rotary valve at a very restricted rate only. Also, in this operating position of the valve 14 pipes 35 and 37 are isolated from each other, so that the partition or section 4 of the engineer's brake valve is effective, and the engineer is unable to re-charge the equalizing reservoir 39 or chamber D. Further, with the slide valve 14 in its operated position the feed valve FV is isolated from main reservoir pressure, so that feed valve pressure is no longer available in the engineer's brake valve for charging the brake pipe and the equalizing reservoir in the running position of the brake valve. In other words, the engineer's brake valve cannot be used to feed either the equalizing reservoir or the brake pipe with feed valve pressure when in the running position, nor can it be used for feeding main reservoir pressure to the equalizing reservoir or brake pipe at any appreciable rate. This by reason of the restriction of port 46. With the slide valve 14 in its shifted brake applying position the cavity 49 connects the pipe 47 leading from the equalizing reservoir to the restricted exhaust port 48, and thereby vents the equalizing reservoir to atmosphere at a restricted rate. Venting of the equalizing reservoir will of course cause the equalizing discharge piston and valve to function to effect venting of the brake pipe as already explained.

It may be here stated that the size of the restricted opening 48 permits substantially the same degree of venting as results when the engineer's brake valve is moved to the service position and the equalizing reservoir is vented through the usual preliminary exhaust port of the engineer's brake valve. With the equalizing reservoir pressure reduced in response to the venting just mentioned, the equalizing discharge piston 6 is lifted and brake pipe pressure is exhausted through the discharge piston and valve 6—7 and a service brake application results.

Also, if desired the restricted port 48 may have connected thereto a limited reduction spring actuated blow-off valve, whereby exhaust will be discontinued if equalizing reservoir pressure has been reduced to a predetermined value. Such a reduction limiting valve has been shown in Fig. 2 and may, if desired, be considered to comprise part of apparatus shown in Fig. 1. In the particular arrangement shown this spring controlled blow-off valve is integral with the application valve so that it cannot be removed by unauthorized persons and comprises a housing 50, containing a valve 51, held closed by a spring 52, the force of which is adjustable by an adjusting wing nut 53, which nut may be locked in any suitable way so as not to be adjustable by unauthorized persons, as by a seal 54. In practice this wing nut 53 is preferably adjusted to permit the escape of air to a value to assure a full service brake application even though initial brake pipe pressure is comparatively low.

It is thus noted that with the application valve in its brake applying position the engineer cannot prevent an automatic brake application, for if he moves his engineer's brake valve to the running position main reservoir pressure is cut off of the feed valve at the port 32, and if he moves his engineer's brake valve to the release position the flow of main reservoir pressure is restricted by the restricted port 46. On the other hand, if the engineer should desire to make a manual emergency application of the brakes at a time when the application valve is in the brake applying position, he may do so by moving his handle 8 to the emergency position in which event pressure is vented from the brake pipe BP through the usual emergency opening and at this same position of the engineer's brake valve sufficient main reservoir pressure is fed to the distributing valve of the E. T. equipment so as to effect an emergency brake application by the brake cylinders carried by the engine and tender.

It is thus noted that in accordance with applicant's invention all of the braking apparatus already installed on an engine when being equipped with automatic train control may be used and that very little additional apparatus need be added; that the usual equalizing reservoir and equalizing discharge piston and valve 6—7 are used; and that the apparatus used for venting this equalizing reservoir may be much lighter and smaller, by reason of the small amount of air that need be vented therefrom in order to effect a brake application. Further, the apparatus embodying this invention employs operating features which enable the engineer to apply the brakes in substantially the same way as if no automatic train control apparatus had been superimposed upon his braking system, but that he cannot prevent or restrict the brake application imposed automatically.

Also, it should be noted that main reservoir pressure has been cut off of the engineer's brake valve to an extent to prevent him from releasing the brakes when they have been automatically applied, but at the same time sufficient main reservoir pressure may flow to the engineer's brake valve to allow him to effect an emergency application of the engine and tender brakes. Having thus shown and described one specific embodiment of the invention, either with or without having a limited reduction cut-off device applied thereto, it is desired to be understood that the various parts have been shown conventionally for the purpose of disclosing the underlying principles of the invention and not with the intent of illustrating the exact construction preferably employed in the practicing of the same; and that various changes, modifications, and additions may be made to adapt the invention to any one of the various air brake systems now in use; for instance, in a certain air brake system known to applicant and called an E. T. equipment, main reservoir pressure is fed through a restricted opening through the engineer's brake valve, when in the service position, to the distributing valve of the E. T. equipment, and the present invention may be applied to such E. T. equipment; all without departing from the spirit of the present invention except as demanded by the scope of the following claims.

What I claim is:—

1. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, and a by-pass for normally connecting opposite sides of said partition.

2. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition, and means for venting said equalizing reservoir and closing said by-pass.

3. Automatic brake applying apparatus for controlling by train control apparatus the brakes of an air brake system of the normally charged brake pipe type and including a sectionalized engineer's brake valve including the associated equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; and means for simultaneously restricting the flow of fluid pressure from said source to said brake valve, closing said by-pass and venting said equalizing reservoir.

4. Automatic brake applying apparatus for controlling by train control apparatus the brakes of an air brake system of the normally charged brake pipe type and including a sectionalized engineer's brake valve including the associated equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; and means for simultaneously restricting to a limited extent the flow of fluid pressure from said source to said brake valve, closing said by-pass and venting said equalizing reservoir.

5. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; and of an application valve for blanking said equalizing reservoir from said engineer's brake valve, venting said equalizing reservoir and restricting the flow of fluid pressure to said engineer's brake valve upon operation of said application valve.

6. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; and of an application valve for blanking said equalizing reservoir from said engineer's brake valve, venting said equalizing reservoir and restricting to a limited extent only the flow of fluid pressure to said engineer's brake valve upon operation of said application valve.

7. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; an application valve operated upon venting of fluid pressure from a chamber therein, valves in said application valve for blanking said equalizing reservoir from said engineer's brake valve, venting said equalizing reservoir and restricting the flow of fluid pressure from said source to said engineer's brake valve upon operation of said application valve.

8. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; an application valve operated upon venting of fluid pressure from a chamber therein, valves in said application valve for blanking said equalizing reservoir from said engineer's brake valve, venting said equalizing reservoir and restricting to a limited extent only the flow of fluid pressure from said source to said engineer's brake valve upon operation of said application valve.

9. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; and an application valve effective when operated to blank said equalizing reservoir from said engineer's brake valve, vent said equalizing reservoir, cut said feed valve off of said engineer's brake valve, and restrict the flow of main reservoir pressure to said engineer's brake valve.

10. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; and an application valve effective when fluid pressure is vented therefrom to blank said equalizing reservoir from said engineer's brake valve, vent said equalizing reservoir, cut said feed valve off of said engineer's brake valve, and restrict the flow of main reservoir pressure to said engineer's brake valve.

11. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; and an application valve effective when operated to blank said equalizing reservoir from said engineer's brake valve, vent said equalizing reservoir, cut said feed valve off of said engineer's brake valve, and restrict (to a limited extent only) the flow of main reservoir pressure to said engineer's brake valve.

12. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; and an application valve effective when fluid pressure is vented therefrom to blank said equalizing reservoir from said engineer's brake valve, vent said equalizing reservoir, cut said feed valve off of said engineer's brake valve, and restrict (to a limited extent only) the flow of main reservoir pressure to said engineer's brake valve.

13. In brake applying apparatus for automatic train control systems; the combination with a normally charged brake pipe type air brake system including an engineer's brake valve, equalizing discharge piston and valve, of an application valve for blanking said equalizing reservoir from said engineer's brake valve, connecting said equalizing reservoir to a vent port, and restricting the flow of fluid pressure to said engineer's brake valve upon operation of said application valve, and spring actuated means for preventing the escape of fluid pressure from said vent port when said equalizing reservoir pressure has been reduced to a predetermined value.

14. In brake applying apparatus for automatic train control systems; the combination with a normally charged brake pipe type air brake system including an engineer's brake valve, equalizing discharge piston and valve, of an application valve for blanking said equalizing reservoir from said engineer's brake valve, connecting said equalizing reservoir to a vent port, and restricting to a limited extent only the flow of fluid pressure to said engineer's brake valve upon operation of said application valve, and spring actuated means for preventing the escape of fluid pressure from said vent port when said equalizing reservoir pressure has been reduced to a predetermined value.

15. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition, and means automatically controlled from the trackway in accordance with traffic conditions ahead for venting said equalizing reservoir and closing said by-pass.

16. Automatic brake applying apparatus for controlling by train control apparatus the brakes of an air brake system of the normally charged brake pipe type and including a sectionalized engineer's brake valve including an equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; and train control apparatus for simultaneously restricting the flow of fluid pressure from said source to said brake valve, closing said by-pass and venting said equalizing reservoir 17. Automatic brake applying apparatus for controlling by train control apparatus the brakes of an air brake system of the normally charged brake pipe type and including a sectionalized engineer's brake valve including the associated equalizing discharge piston valve having a chamber above the same, an equalizing reservoir and a source of fluid pressure for feeding said brake valve; of an insert inserted between the sections of said engineer's brake valve to constitute a partition in said chamber, a by-pass for normally connecting opposite sides of said partition; and train control apparatus for simultaneously restricting to a limited extent the flow of fluid pressure from said source to said brake valve, closing said by-pass and venting said equalizing reservoir.

18. In brake applying apparatus for automatic train control systems; the combination with a normally charged brake pipe type air brake system including an engineer's brake valve, equalizing discharge piston and valve, equalizing reservoir, and a source of fluid pressure for feeding a supply pipe to said engineer's brake valve; of an application valve for blanking said equalizing reservoir from said engineer's brake valve, venting said equalizing reservoir and restricting the flow of fluid pressure to said engineer's brake valve upon operation of said application valve, and automatic train control means for controlling said application valve.

19. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; an application valve effective when fluid pressure is vented therefrom to blank said equalizing reservoir from said engineer's brake valve, vent said equalizing reservoir, cut said feed valve off of said engineer's brake valve, and restrict the flow of main reservoir pressure to said engineer's brake valve, and automatic train control means for controlling said application valve.

20. In brake applying apparatus for automatic train control systems; the combination with a normally charged brake pipe type air brake system including an engineer's brake valve, equalizing discharge piston and valve, equalizing reservoir, feed valve for feeding a reduced pressure to the brake pipe when the engineer's brake valve is in the running position and a source of main reservoir pressure; an application valve effective when fluid pressure is vented therefrom to blank said equalizing reservoir from said engineer's brake valve, vent said equalizing reservoir, cut said feed valve off of said engineer's brake valve, and restrict (to a limited extent only) the flow of said reservoir pressure to said engineer's brake valve, and train control means for operating said application valve.

In testimony whereof I affix my signature.

CHARLES S. BUSHNELL.